Sept. 18, 1956   R. J. FRITZ   2,763,595
HEAT BALANCED HYDROFORMING PROCESS
Filed Dec. 20, 1952
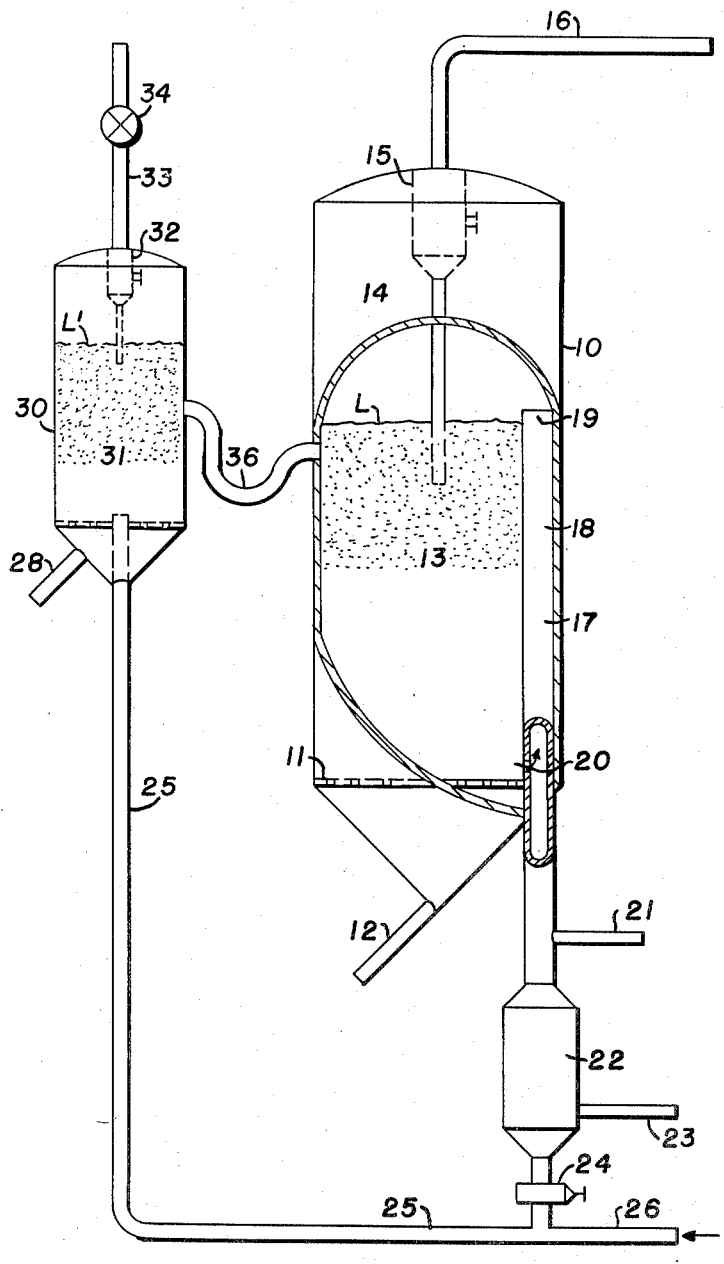
Robert J. Fritz   Inventor
By H. M. Feyrer   Attorney United States Patent Office 2,763,595
Patented Sept. 18, 1956

2,763,595

HEAT BALANCED HYDROFORMING PROCESS

Robert J. Fritz, Baton Rouge, La., assignor to Esso Research and Engineering Company, a corporation of Delaware Application December 20, 1952, Serial No. 327,143

14 Claims. (Cl. 196—50)

This invention pertains to the catalytic conversion of hydrocarbons and more particularly to the catalytic reforming or hydroforming of hydrocarbon fractions boiling within the motor fuel or naphtha range of low knock rating into high octane number motor fuels rich in aromatics by the fluidized solids technique.

Hydroforming is a well known process for treating hydrocarbon fractions boiling within the motor fuel or naphtha range to upgrade the same or increase the aromaticity and improve the anti-knock characteristics of such fractions. By hydroforming is ordinarily meant an operation conducted at elevated temperatures and pressures in the presence of solid catalyst particles and hydrogen whereby the hydrocarbon fraction is increased in aromaticity and in which operation there is no net consumption of hydrogen. Hydroforming operations are ordinarily carried out in the presence of hydrogen or a hydrogen-rich recycle gas (i. e., at relatively high hydrogen partial pressures) in the pressure range of from about 50–1000 lbs. per sq. inch at temperatures of about 750–1150° F. and in contact with such catalysts as molybdenum oxide, chromium oxide or, in general, oxides or sulfides of metals of groups IV–VIII of the periodic system of elements, alone, or generally dispersed upon a base or spacing agent such as alumina gel, precipitated alumina, or zinc aluminate spinel.

It has been proposed to effect the hydroforming of naphtha fractions in a fluidized solids reactor system in which naphtha vapors are passed continuously through a dense, fluidized bed of hydroforming catalyst particles in a reaction zone, spent catalyst particles are withdrawn from the dense bed in the reaction zone and passed to a separate regeneration zone where inactivating carbonaceous deposits are removed by combustion whereupon the regenerated catalyst particles are returned to the main reactor vessel or hydroforming reaction zone. Fluid hydroforming as thus conducted has several fundamental advantages over fixed bed hydroforming such as (1) the operations are continuous, (2) the vessels can be designed for single rather than dual functions, (3) the reactor temperature is substantially constant throughout the reactor dense bed, and (4) the regeneration or reconditioning of the catalyst may be readily controlled.

A further advantage of the foregoing fluidized solids technique has been the fact that the freshly regenerated catalyst can be utilized to carry part of the heat required for the hydroforming reaction from the regeneration zone into the reaction zone. It has been proposed in this connection to discharge hot freshly regenerated catalyst particles into a stream of hot, hydrogen-rich recycle gas in a transfer line whereby the catalyst particles are subjected to a reconditioning treatment during their passage through the transfer line into the reactor. This reconditioning or pretreatment of the regenerated catalyst particles involves at least a partial reduction of higher catalytic metal oxides formed during regeneration to a lower or more catalytically active form of catalytic metal oxide. In view of the high temperature of the regenerated catalyst (1050–1200° F.) and the exothermic character of the reduction or reaction between the regenerated catalyst and the hydrogen, it is necessary to make the transfer line very short and of small diameter in order to keep the time of contact of the freshly regenerated catalyst and the hydrogen-containing gas sufficiently short to avoid overtreatment and/or thermal degradation of the catalyst. It has been proposed to alleviate this problem by mixing recycle reactor catalyst with the freshly regenerated catalyst to lower and control the temperature of pretreatment while simultaneously recovering the sensible heat of the regenerated catalyst as well as the heat released by the partial reduction of the catalytic metal oxides for use in the hydroforming reaction zone. Although this expedient permits recovery of a substantial amount of heat for use in the hydrocarbon conversion, the total amount of heat that may be recovered and supplied to the reaction zone by the catalyst is limited by the low catalyst to oil ratios that must ordinarily be maintained in hydroforming reactions because of selectivity considerations. Since the amount of heat released in the regenerator is so great that the catalyst is incapable of transferring it to the reaction zone at the low catalyst to oil ratios, it is common practice to arrange cooling coils in the regenerator to remove heat generated over and above that which can be safely transferred to the reactor by the catalyst. It is therefore necessary to supplement the heat supplied by the catalyst and this is done by preheating the feed stock and recycle or hydrogen-rich gas to temperatures well above the average reactor temperature. This preheating has an adverse effect upon the yield of liquid products since it brings about thermal degradation of the feed as well as some of the higher molecular weight constituents of the recycle gas. Moreover, excessively large amounts of recycle gas must be introduced to carry heat into the reaction zone and the cost of this extra compressor and heat exchanger capacity adds very substantially to the total cost of the plant.

It is the object of this invention to provide the art with an improved method for reforming hydrocarbon fractions by the fluidized solids technique.

It is also the object of this invention to provide the art with a means for using the heat available from the regeneration for the reaction which avoids excessive carbon yields obtained when the catalyst to oil ratio is increased.

It is a further object of this invention to provide the art with a simple, economical fluid hydroforming design in which inert heat transfer solids are circulated between the reaction zone and the regeneration zone.

These and other objects will appear more clearly from the detailed specification and claims which follow.

It has now been found that a heat balanced hydroforming operation can be carried out in a simple yet highly effective manner by the use of an inert solid heat transfer medium circulating with the catalyst between the reactor and regenerator in a particular manner. It is, of course, old to use so-called pebble heaters to heat up an extraneous heat-carrying solid for circulating through a reaction zone in order to convey some or all of the heat required for carrying out the desired reaction into the reaction zone. In general, the previously proposed methods have involved either the circulation of the inert solids and the catalyst particles as separate streams or the dilution of the catalyst by a certain amount of inert, heat transfer solid and circulating the catalyst-inert solids of substantially constant composition between the reactor and regeneration vessels. The former systems are objectionable because they require the use of two or more circulating systems with separate, complicated controls while the latter are objectionable because of the fact that the inert heat transfer solids occupy valuable reactor and regenerator space and therefore require the use of larger vessels or a substantial reduction in the throughput or feed rate to the system.

In accordance with the present invention, catalyst and inert heat transfer solids are circulated between the reactor and the regenerator in the same transfer lines and yet the individual rates of circulation for the two solids can be controlled by withdrawing a mixture of catalyst and heat transfer solids from the dense, fluidized bed in the reactor into a stripper where the mixture of solids is subjected to elutriation conditions so that the ratio of inert heat transfer solids to catalyst at the bottom of the stripper is at the desired value. The mixture of inert heat transfer solids and catalyst in the desired ratio is discharged from the stripper through a slide valve or the like for controlling the total circulation rate of the said mixture to the regenerator where carbonaceous deposits of other combustible materials are burned, heating the catalyst and inert solids for recirculation to the reactor.

Reference is made to the accompanying drawing illustrating a diagrammatic flow plan of one embodiment of the present invention.

In the drawing, 10 is the reactor vessel and 30 is the regenerator vessel in a fluidized solids hydroforming reactor system. A perforated distributing plate or grid 11 is arranged in the lower part of the reactor vessel in order to distribute the vaporous and gaseous reactants and diluents supplied to the vessel through inlet line 12 uniformly over the entire cross section of the reactor vessel. If desired, the hydrogen-rich recycle gas can be supplied through line 12 and the feed stocks or naphtha vapors can be supplied through a separate inlet line preferably terminating in a distributor ring or the like above the grid 11. The reactor vessel 10 is charged with finely divided catalyst particles and inert heat transfer solids which are maintained as a dense, fluidized, liquid-simulating mass or bed 13 having a definite level L or interface separating the dense bed from the disperse or dilute phase 14 comprising small amounts of solid particles entrained in vaporous reaction mixture. Reaction products pass overhead from the reactor dense bed and are passed through cyclone separator 15 or the like to free them of most of the solid particles that are entrained therewith. The separated catalyst particles are returned to the reactor dense bed 13 through the dip leg attached to the bottom of cyclone separator 15. Reaction products substantially free of catalyst or other solid particles are removed through product outlet line 16 to suitable product recovery, stabilizing and/or storage equipment.

Suitable catalysts for charging to the reactor vessel 10 are group VI metal oxides such as molybdenum oxide, chromium oxide, tungsten oxide, vanadium oxide or the like, or mixture thereof preferably upon a carrier such as activated alumina, zinc aluminate spinel or the like. The catalyst particles should, for proper fluidization, be between about 200 and 400 mesh in size or about 0 to 200 microns in diameter with a major proportion between about 20 and 80 microns.

The inert, heat transfer solids are preferably coarser and/or of greater density than the catalyst used in the process. Suitable materials for use as inert heat transfer solids are corundum, mullite, a fused alumina, fused silica or the like. It is necessary that the heat transfer material have no adverse effects upon the catalytic reaction or hydroforming process and that they be stable or resistant to breakdown due to the temperature and mechanical action to which they are subjected in the process. The heat transfer solids may vary from about 300 to 500 microns in diameter and are preferably in the shape of spherical or spheroidal particles. The inert particles are of as large a diameter as may be used and still obtain proper fluidization in the transfer lines and in the regenerator.

Catalyst and inert transfer solids are discharged from the dense bed 13 in the reactor vessel into a stripping cell 17 comprising an elongated conduit 18 having its upper end 19 above the dense bed level L and its lower end extending downwardly through the bottom of the vessel. Since a segregation of the catalyst particles and the inert heat exchange material tends to occur in the reactor dense bed, it is preferable to arrange the orifice 20 for the discharge of catalyst and heat transfer solids from dense bed 13 into stripper 17 at or just above the distributor plate 11 in order to withdraw a mixture rich in inert heat exchange solids from the reactor. Steam, recycle gas or other suitable elutriating gas is introduced into conduit 18 at 21 in order to subject the mixture of inert heat exchange solids and catalyst particles to elutriation conditions. Packing such as Raschig rings or Berl saddles or disc and donut baffles can be arranged in conduit 18 in order to facilitate or improve the separation of a major part of the catalyst particles from the inert heat transfer solids. Elutriation should not be carried beyond the point where difficulties is fluidization of the inert heat exchange solids-rich stream is encountered and preferably is carried only to the point where the ratio of heat transfer solids to catalyst is from about 3:1 to about 4:1. Actually a mixture of finer catalyst and coarser shot can be circulated in the transfer lines much easier than can the coarse shot alone so that the partial separation required in this invention represents an operating advantage.

If additional stripping of the hydrocarbon vapors from the solids is required, a further stripping section 22 may be provided below the elutriation section. Stripping gas is introduced at 23 and stripping gas as well as elutriation gas passes upwardly through conduit 18 carrying catalyst particles therewith which are discharged from the upper end of conduit 19 into the disperse phase 14 where the solids separate out and return to the dense bed either directly from the disperse phase or through the dip pipe attached to cyclone separator 15.

The mixture of a major proportion of inert heat transfer solids is discharged from the base of the stripper conduit 18 into transfer line 25 at a rate controlled by slide valve 24. Carrier gas is supplied through inlet line 26 to convey the mixture of inert solids and catalyst through the transfer line 25 into regenerator 30. The carrier gas may be steam, flue gas, air or a mixture of these gases. If insufficient air to effect the regeneration of the catalyst is included in the carrier gas, additional air can be supplied directly to the regenerator vessel as through inlet line 28. Since combustion occurs very rapidly due to the nature of the catalyst undergoing regeneration and the pressure maintained on the system, it is possible to effect regeneration in the transfer line in which event it is unnecessary to provide a separate regenerator vessel. In this case, the transfer line would merely discharge into a cyclone separator or the like to disengage the flue gas from the solid particles which are either discharged through a dipleg on the cyclone directly back into the reactor dense bed or collected in a storage hopper or the like for return to the reactor vessel.

In a separate regenerator vessel as shown, the regeneration gases pass through the mixture of inert solids and catalyst at a rate sufficient to establish a dense, fluidized liquid simulating bed 31 having a definite level L'. Combustion gases pass overhead from dense bed 31 through a cyclone separator 32 for removing entrained inert heat exchange solids and/or catalyst particles for return to the dense bed 31. Combustion gases substantially free of solid particles pass overhead through outlet line 33 and pressure relief or control valve 34 to a waste gas stack or to suitable scrubbing and storage equipment in the event that it is desired to use this gas as carrier or stripping gas in the system.

The mixture of inert heat transfer solids and catalyst particles is withdrawn directly from the dense bed 31 and returned to the reactor via U-bend line 36 or other suitable transfer line. It is preferable to provide some means for stripping the mixture of solids before returning the same to the reactor dense bed. This may be in the form of a stripping cell in the regenerator or in the transfer line. The catalyst may be given a brief treatment with hydrogen-rich or recycle gas in the transfer line in order to partially reduce the catalytic metal oxide, which is ordinarily oxidized to a high state of oxidation in the regenerator, to a lower form of oxide which is more catalytically active. For example, molybdenum oxide is oxidized to $MoO_3$ in the regeneration but is preferably in the form of $Mo_2O_5$ or $MoO_2$ or a complex mixture of oxides in which the average valence of the molybdenum is between about 4.3 and about 5.0. In the preferred embodiment, the catalyst in admixture with the inert heat transfer solids is returned to the reactor without pretreatment or without contact with hydrogen or hydrogen-rich gas. In this way, pretreatment is effected at reactor temperature which obviates the danger of overpretreatment or thermal degradation of the catalyst and in the presence of the total volume of reactant and diluent vapors which serve to minimize water partial pressure formed as a result of the reaction of hydrogen with the catalytic metal oxide.

A typical operation of the reactor system is as follows:

The reactor vessel 10 is charged with a mixture of catalyst comprising about 10 wt. percent molybdenum oxide upon activated alumina and mullite or fused alumina inert heat transfer solids. The ratio of catalyst to inert heat transfer solids in the reactor is at least 4:1 and is preferably more than 8:1 in order to minimize the effect of the inert heat transfer solids upon the capacity of the reactor. The catalyst particles are less than 200 microns in diameter with a major proportion between 20 and 80 microns while the mullite particles are larger than about 300 microns and are preferably from about 300 to 500 microns in diameter. The larger particle size and higher density of the mullite or shot allows it to settle rapidly in the reactor so that it does not take up much reactor volume. That is, the concentration of inert heat transfer medium is low in the reactor. The larger particle size and higher density of the shot also facilitates its concentration in the elutriator so that a relatively large amount of shot relative to catalyst can be circulated between the reactor and the regenerator.

Feed naphtha, preheated to about 975° F. and recycle process gas preheated to about 1150° F. are supplied to the bottom of the reactor at such a rate as to maintain a superficial velocity of vapors through the reactor of from about 0.7 to about 0.9 ft. per second. The space velocity or pounds of feed charged per hour per pound of catalyst in the reactor is about 0.2–0.8 and recycle gas is supplied at a rate of about 3000 cu. ft. per barrel of feed. The pressure in the reactor bed is about 200 lbs. per sq. inch and the average temperature in the reactor is about 900–925° F.

Catalyst and mullite are withdrawn from the dense bed 13 into the stripper section 17 and steam or elutriation gas is supplied through inlet 21 to establish a superficial velocity in stripper 17 of about 2 to 5 ft. per second in order to control the mullite to catalyst ratio. A mixture of mullite and catalyst in the ratio of 3 or 4 to 1 is discharged from the elutriation zone, stripped, if necessary, in section 22 and then discharged into transfer line 25 where it is picked up by a stream of regeneration gas or air and conveyed to regenerator 30 where carbonaceous deposits are burned off at temperatures of about 1050 to 1200° F. Regenerated catalyst and inert heat transfer solids in the same ratio as was discharged into transfer line 25 is withdrawn from the regenerator, stripped free of oxygen and/or carbon oxides and returned to the reactor.

Circulation may be controlled as follows: If the regenerator temperature starts to fall, the amount of steam supplied to the elutriator is reduced permitting more catalyst to pass to the regenerator (reducing ratio of inert solids to catalyst from 3 or 4 to 1 to about 2 to 1). The increased burning occasioned by the increase in the amount of catalyst supplied to the regenerator tends to raise the regenerator temperature. If the reactor temperature falls, the circulation rate of both mullite and catalyst can be increased by opening the slide valve 24. Another method of control would be to burn natural gas or other available fuel in the regenerator in order to raise the regenerator temperature and supply more heat to the system. This ordinarily would be preferable to increasing the catalyst circulation rate. It may thus be seen that as long as the inert heat transfer solids/catalyst ratio can be controlled in the elutriator and as long as the total circulation rate of the two solids can be controlled by the slide valve, complete control of the individual solids stream is achieved and the most appropriate method of control can be chosen for each individual case.

The feed or charging stock to the hydroforming reactor may be a virgin naphtha, a cracked naphtha, a Fisher-Tropsch naphtha on the like having a boiling range of from about 125–450° F. or it may be a narrow boiling cut within this range. The feed stock is ordinarily preheated to about 800–1000° F., preferably about 950° F. Thermal degradation of the feed naphtha can be minimized by lowering preheat temperature and/or by limiting the time of residence of the naphtha in the heating coils, the transfer and feed inlet lines.

The recycle gas, which contains from about 50 to 80 volume per cent hydrogen is preheated to temperatures of about 1050–1200° F., preferably below about 1100° F. to minimize the danger of cracking any $C_4$ or higher hydrocarbons in the recycle gas. The recycle gas may be circulated through the reactor at a rate of from about 1000 to 8000 cu. ft. per barrel of naphtha feed. In general, it is preferred to utilize the minimum amount of recycle gas that will suffice to keep carbon formation to a desired low level and thus minimize cooling, repressuring and reheating capacity of the system.

The reactor system is charged with a mass of finely divided hydroforming catalyst particles. Suitable catalysts include group VI metal oxides such as molybdenum oxide, chromium oxide, tungsten oxide, or vanadium oxide or mixtures thereof preferably dispersed upon a support or carrier such as activated alumina, alumina gel, zinc aluminate spinel or the like. Preferred catalysts contain about 5 to 15 wt. percent molybdenum oxide or from about 10 to 40 wt. percent chromium oxide upon a suitable carrier. If desired, minor amounts of stabilizers and promoters such as silica, calcium, ceria or potassia can be included in the catalyst. The catalyst particles are for the most part between 200 and 400 mesh in size or about 0–200 microns in diameter with a major proportion between 20 and 80 microns.

The inert heat transfer solids or shot are preferably coarser and/or of greater density than the catalyst used in the process. It is essential that the heat transfer solids have no adverse effects upon the catalytic reactions occurring in the reactor and that they be resistant to breakdown due to the temperature and the mechanical action to which they are subjected. Unless the inert heat transfer solids are relatively heavy or have a bulk density at least 1.5 times the bulk density of the catalyst, they should be no smaller than about 300 microns and are preferably in the range of about 300–500 microns.

The hydroforming reactor vessel is operated at temperatures between about 850 and 1000° F. and at pressures of from about 50 to about 1000 lbs. per sq. inch. Small amounts of water vapor are present in the reaction zone due principally to the presence of water in the feed and in the recycle gas and also due to the formation of water in the regeneration of the spent catalyst as well as in the reduction of the regenerated catalyst particles. The presence of these small amounts of water permits operation at somewhat higher temperatures without loss in selectivity than is possible in systems lacking this small water partial pressure.

Regeneration of the spent reactor catalyst is effected at essentially the same pressure as is maintained in the hydroforming reaction zone and at temperatures of about 1100–1200° F. The average residence time of the catalyst in the reactor is of the order of from about 3 to 4 hours while the average residence time of the catalyst in the regenerator is of the order of from about 3 to 15 minutes. The average residence time of the inert solids in the reaction zone is of the order of from about 20 minutes to 1 hour and in the regeneration zone of about 3 to 15 minutes. The concentration of shot in the regenerator can be kept high inasmuch as the catalyst regeneration is extremely rapid, and the presence of the inert solids would not appreciably prolong the catalyst regeneration.

The weight ratio of catalyst to oil introduced into the reactor should be about 0.5 to about 3.5. It is ordinarily preferable to operate at catalyst to oil ratios of about 1.0 since higher ratios tend to give excessive carbon formation. Somewhat higher weight ratios can be used at higher temperatures.

Space velocity or the weight in pounds of feed charged per hour per pound of catalyst in the reactor depends upon the age or activity level of the catalyst, the character of the feed stock and the desired octane number of the product. Space velocity for a molybdenum oxide upon alumina gel catalyst may vary, for example from about 1.5 wt./hr./wt. to about 0.15 wt./hr./wt.

The foregoing description contains a limited number of embodiments of the present invention. It will be understood, however, that this invention is not limited thereto since numerous variations are possible without departing from the scope of this invention.

What is claimed is:

1. In the method of reforming hydrocarbon fractions boiling within the naphtha range in contact with a mixture of at least four parts by weight of finely divided reforming catalyst particles per part by weight of inert heat transfer solid particles in a dense, fluidized bed, the improvement which comprises withdrawing a mixture of catalyst and inert heat transfer solids from the dense bed in the reactor zone, elutriating the withdrawn mixture to convey catalyst particles back into the reaction zone and withdrawing from the elutriation step an elutriated mixture comprising about 3 to 4 parts by weight of inert heat transfer solids per part by weight of catalyst, subjecting the elutriated mixture to the action of air to burn carbonaceous deposits from the catalyst and heat the mixture of inert heat transfer solids and catalyst, and recycling the said hot mixture containing 3 to 4 parts by weight of inert heat transfer solids per part by weight of catalyst to the reaction zone, whereby a major portion of the heat released in the regeneration of the catalyst is transferred to the reactor zone by the inert heat transfer solids while said solids occupy at most only a minor portion of the reactor volume.

2. A method of reforming hydrocarbon fractions boiling within the motor fuel range which comprises maintaining said hydrocarbon fractions in contact with a dense, fluidized liquid-simulating bed comprising at least four parts by weight of finely divided reforming catalyst particles per part by weight of inert heat transfer solid particles maintained under reforming conditions in a reactor zone for a period of time sufficient to effect the desired conversion, withdrawing reformed hydrocarbons overhead from the reactor zone, withdrawing a mixture of inert, heat transfer solids and catalyst particles directly from the dense bed, elutriating the withdrawn mixture to convey catalyst particles back into the reaction zone and withdrawing from the elutriation step a mixture comprising a major proportion of inert heat transfer solids and a minor proportion of catalyst particles, treating the elutriated mixture with air at elevated temperatures to burn carbonaceous deposits from the catalyst particles and to heat the mixture of inert heat transfer solids and catalyst and recycling said hot mixture containing a major proportion of inert heat transfer solids and a minor proportion of catalyst to the reaction zone whereby a major proportion of the heat released in the regeneration of the catalyst is transferred to the reaction zone by the inert heat transfer solids while said solids occupy at most only a minor portion of the reactor volume.

3. A method of reforming hydrocarbon fractions boiling within the motor fuel range which comprises maintaining said hydrocarbon fractions in contact with a dense, fluidized liquid-simulating bed comprising at least four parts by weight of finely divided reforming catalyst particles per part by weight of inert heat transfer solid particles maintained under reforming conditions in a reactor zone for a period of time sufficient to effect the desired conversion, withdrawing reformed hydrocarbons overhead from the reactor zone, withdrawing a mixture of inert, heat transfer solids and catalyst particles directly from the bottom of the dense bed, elutriating the withdrawn mixture to convey catalyst particles back into the reaction zone and withdrawing from the elutriation step a mixture comprising a major proportion of inert heat transfer solids and a minor proportion of catalyst particles, treating the elutriated mixture with air at elevated temperatures to burn carbonaceous deposits from the catalyst particles and to heat the mixture of inert heat transfer solids and catalyst and recycling said hot mixture containing a major proportion of inert heat transfer solids and a minor proportion of catalyst to the reaction zone whereby a major proportion of the heat released in the regeneration of the catalyst is transferred to the reaction zone by the inert heat transfer solids while said solids occupy at most only a minor portion of the reactor volume.

4. A method of reforming hydrocarbon fractions boiling within the motor fuel range which comprises maintaining said hydrocarbon fractions in contact with a dense, fluidized liquid-simulating bed comprising at least four parts by weight of finely divided reforming catalyst particles per part by weight of inert heat transfer solid particles maintained under reforming conditions in a reactor zone for a period of time sufficient to effect the desired conversion, withdrawing reformed hydrocarbons overhead from the reactor zone, withdrawing a mixture of inert, heat transfer solids and catalyst particles directly from the bottom of the dense bed, elutriating the withdrawn mixture to convey catalyst particles back into the reaction zone and withdrawing from the elutriation step a mixture comprising a major proportion of inert heat transfer solids and a minor proportion of catalyst particles, treating the elutriated mixture with air at elevated temperatures to burn carbonaceous deposits from the catalyst particles and to heat the mixture of inert heat transfer solids and catalyst and recycling said hot mixture containing a major proportion of inert heat transfer solids and a minor proportion of catalyst directly to the reaction zone without contact with hydrogen or hydrogen-yielding gases whereby a major proportion of the heat released in the regeneration of the catalyst is transferred to the reactor zone by the inert heat transfer solids while said solids occupy at most only a minor portion of the reactor volume.

5. A method of reforming hydrocarbon fractions boiling within the motor fuel range which comprises maintaining said hydrocarbon fractions in contact with a dense, fluidized liquid-simulating bed comprising at least four parts by weight of finely divided reforming catalyst particles per part by weight of inert heat transfer solid particles maintained under reforming conditions in a reactor zone for a period of time sufficient to effect the desired conversion, withdrawing reformed hydrocarbons overhead from the reactor zone, withdrawing a mixture of inert, heat transfer solids and catalyst particles directly from the bottom of the dense bed, elutriating the withdrawn mixture to convey catalyst particles back into the reaction zone and withdrawing from the elutriation step a mixture comprising a major proportion of inert heat transfer solids and a minor proportion of catalyst particles, treating the elutriated mixture with air at elevated temperatures to burn carbonaceous deposits from the catalyst particles and to heat the mixture of inert heat transfer solids and catalyst in a dense fluidized bed in a regeneration zone, withdrawing a mixture of inert heat transfer solids and catalyst particles from the regeneration zone, contacting the withdrawn mixture with a hydrogen-containing gas to partially reduce the catalytic metal oxide and recycling the hydrogen-treated mixture containing a major proportion of inert heat transfer solids and a minor proportion of catalyst to the reaction zone whereby a major proportion of the heat released in the regeneration of the catalyst is transferred to the reaction zone by the inert heat transfer solids while said solids occupy at most only a minor portion of the reactor volume.

6. The process as defined in claim 2 in which the average ratio of catalyst particles to inert heat transfer solids is about 10 to 1 in the reactor.

7. The process as defined in claim 3 in which the average ratio of catalyst particles to inert heat transfer solids is about 10 to 1 in the reactor.

8. The process as defined in claim 4 in which the average ratio of catalyst particles to inert heat transfer solids is about 10 to 1 in the reactor.

9. The process as defined in claim 5 in which the average ratio of catalyst particles to inert heat transfer solids is about 10 to 1 in the reactor.

10. The process as defined in claim 5 in which the average ratio of catalyst particles to inert heat transfer solids is about 10 to 1 in the reactor and about 1 to 3 in the regeneration zone.

11. A method of carrying out endothermic chemical reactions which comprises contacting vaporous hydrocarbon reactants with a mixture of at least four parts by weight of finely divided solid catalyst particles per part by weight of inert, heat-transfer solid particles of greater density and larger average particle size than said catalyst particles in a main reaction zone, controlling vapor velocities through said mixture to form a dense, fluidized bed of solid particles in said main reaction zone, withdrawing finely divided solid catalyst particles from said main reaction zone, withdrawing inert heat transfer solid particles from the lower portion of said main reaction zone at a substantially faster rate than the catalyst forming a mixture of a minor proportion of withdrawn catalyst and the major proportion of withdrawn inert heat transfer solids conveying said mixture of inert heat transfer solids and catalyst to a heating zone, heating said mixture of inert heat transfer solids and catalyst in said heating zone to a temperature substantially above the main reaction zone temperature, and recycling the heated mixture of a minor proportion of catalyst and a major proportion of inert heat transfer solids to the dense fluidized bed in said main reaction zone whereby a major proportion of the heat is supplied to the reaction zone by the inert heat transfer solids while said solids occupy at most only a minor portion of the reactor dense bed volume.

12. The method as defined in claim 11 in which the vaporous reactants comprise hydrocarbons boiling in the motor fuel boiling range and the catalyst is a hydroforming catalyst.

13. The method as defined in claim 12 in which the hydroforming catalyst comprises a group VI metal oxide upon an alumina-containing support and the heating zone is a regenerator where carbonaceous deposits are burned off of the catalyst particles.

14. The method as defined in claim 13 in which the average residence time of the catalyst particles in the main reaction zone is of the order of from about 3 to 4 hours while the average residence time of the inert heat transfer solids in the main reaction zone is of the order of from about 20 minutes to 1 hour.

References Cited in the file of this patent
UNITED STATES PATENTS

| | | |
|---|---|---|
| 2,446,247 | Scheineman | Aug. 3, 1948 |
| 2,472,844 | Munday | June 14, 1949 |
| 2,658,860 | Welty | Nov. 10, 1953 |